(12) United States Patent
Shah et al.

(10) Patent No.: US 11,091,030 B2
(45) Date of Patent: Aug. 17, 2021

(54) DISCONNECT MECHANISM FOR A TANDEM AXLE SYSTEM

(71) Applicant: Dana Heavy Vehicle Systems Group, LLC, Maumee, OH (US)

(72) Inventors: Rahul S. Shah, Pune (IN); Jayawant Chaudhari, Pune (IN)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/736,868

(22) Filed: Jan. 8, 2020

(65) Prior Publication Data
US 2020/0215907 A1  Jul. 9, 2020

Related U.S. Application Data

(60) Provisional application No. 62/815,455, filed on Mar. 8, 2019.

(30) Foreign Application Priority Data

Jan. 9, 2019 (IN) .............................. 201911001062

(51) Int. Cl.
| | |
|---|---|
| *F16H 48/00* | (2012.01) |
| *B60K 17/36* | (2006.01) |
| *F16H 48/20* | (2012.01) |
| *B60K 17/16* | (2006.01) |
| *F16H 48/24* | (2006.01) |
| *F16H 48/08* | (2006.01) |

(52) U.S. Cl.
CPC ............. *B60K 17/36* (2013.01); *B60K 17/16* (2013.01); *F16H 48/00* (2013.01); *F16H 48/20* (2013.01); *F16H 48/24* (2013.01); *B60K 17/165* (2013.01); *F16H 48/08* (2013.01)

(58) Field of Classification Search
CPC ...... B60K 17/36; B60K 17/16; B60K 17/165; B60K 2023/0841; B60K 2023/085; B60K 23/08; B60K 17/3462; B60K 17/346; F16H 48/20; F16H 48/24; F16H 48/00; F16H 48/08; F16H 48/32; B60Y 2400/421; B60Y 2400/422; B60Y 2400/408

See application file for complete search history.

(56) References Cited

U.S. PATENT DOCUMENTS

| | | | |
|---|---|---|---|
| 4,046,210 A | 9/1977 | Nelson | |
| 5,711,389 A * | 1/1998 | Schlosser | ............... B60K 17/36 180/197 |
| 5,860,889 A * | 1/1999 | Schlosser | ............... B60K 17/36 180/24.09 |
| 7,093,681 B2 | 8/2006 | Strain | |
| 8,398,520 B1 | 3/2013 | Bassi | |
| 8,562,479 B2 | 10/2013 | Hamperl | |

(Continued)

*Primary Examiner* — David J Hlavka
(74) *Attorney, Agent, or Firm* — Marshall & Melhorn, LLC

(57) ABSTRACT

A vehicle includes a tandem axle system having an inter-axle differential and clutching assembly, a forward or first axle assembly, and a rear or second axle assembly. The inter-axle differential and clutching assembly includes a differential mechanism having first and second side gears and a clutch mechanism having a clutch member and an actuator assembly. At least one of the first axle assembly and the second axle assembly is in selective driving engagement with the inter-axle differential and clutching assembly.

13 Claims, 9 Drawing Sheets

(56) References Cited

U.S. PATENT DOCUMENTS

| | | | |
|---|---|---|---|
| 8,651,994 B2 * | 2/2014 | Bassi | B60K 23/08 |
| | | | 475/221 |
| 8,851,212 B2 | 10/2014 | Kahl | |
| 9,103,433 B2 * | 8/2015 | Kwasniewski | F16H 57/0445 |
| 9,381,806 B2 | 7/2016 | Tavvala | |
| 9,656,545 B2 | 5/2017 | Dubey | |
| 2006/0272866 A1 | 12/2006 | Ziech | |
| 2016/0280066 A1 | 9/2016 | Tavvala | |
| 2018/0259052 A1 * | 9/2018 | Chinitz | B60K 17/346 |

* cited by examiner

DISCONNECT MECHANISM FOR A TANDEM AXLE SYSTEM

CROSS REFERENCE TO RELATED APPLICATIONS

The present patent application claims the benefit of Indian Provisional Patent Application No. 201911001062, filed Jan. 9, 2019, and U.S. Provisional Patent Application No. 62/815,455, filed Mar. 8, 2019, which are fully incorporated herein by reference in their entirety

BACKGROUND

Conventional tandem axle systems have two drivable axles for a vehicle. Such tandem axle systems typically include either 6×4 drivelines (i.e. two wheels on a steer axle and four driving wheels on a pair of tandem axles behind the steer axle) or 6×2 drivelines (i.e., two wheels on the steer axle and four wheels on the tandem axles behind the steer axle where only two wheels are on a drive axle). The 6×2 drivelines are often undesirable since they lack the required tractive effort under poor traction conditions. However, the 6×4 drivelines are also undesirable because under most driving traction coefficient conditions, two drive axles are not required to develop the necessary tractive effort for a truck, such as a Class 8 truck, Additionally, the 6×4 drivelines can be costly and heavy.

At startup, on grades, at low speeds, during backup maneuvering, or in other environments where additional traction is needed, it would be beneficial to operate a tandem vehicle in a 6×4 mode. However, as the tandem vehicle nears a predetermined speed or condition where less traction is required, operating the tandem vehicle in a 6×2 mode is more desirable as it increases efficiency.

In view of the disadvantages of the known prior art systems, it would be advantageous to develop a tandem axle system that allows a tandem vehicle to selectively operate in both the 6×2 and 6×4 modes.

SUMMARY

In concordance and agreement with the present disclosure, a tandem axle system that allows a tandem vehicle to selectively operate in both a 6×2 mode and a 6×4 mode, has surprisingly been discovered.

In one embodiment of the present disclosure, a tandem axle system comprises: a first axle assembly; a second axle assembly; and an inter-axle differential and clutching assembly coupled to at least one of the first axle assembly and the second axle assembly, wherein the inter-axle differential and clutching assembly includes an inter-axle differential having a differential mechanism and a clutch mechanism, wherein the differential mechanism includes a first side gear drivingly connected to one of the first and second axle assemblies, and a second side gear disposed about a pinion drivingly connected to of one of the first and second axle assemblies, and wherein the clutch mechanism includes a movable clutch member disposed on the pinion and configured to selectively engage the second side gear.

As aspects of certain embodiments, at least one of the first axle assembly and the second axle assembly includes a plurality of axle half shafts.

As aspects of certain embodiments, the differential mechanism further includes a bearing disposed between the second side gear and the pinion.

As aspects of certain embodiments, the clutch member is in splined engagement with the pinion.

As aspects of certain embodiments, the second side gear includes a plurality of first teeth and a plurality of second teeth formed thereon.

As aspects of certain embodiments, the clutch member includes a plurality of teeth formed thereon.

As aspects of certain embodiments, the teeth of the clutch member selectively engages the first teeth formed on the second side gear.

As aspects of certain embodiments, the second teeth of the second side gear are in meshed engagement with at least one pinion gear of the differential mechanism.

As aspects of certain embodiments, the differential mechanism is at least partially disposed in a housing.

As aspects of certain embodiments, the inter-axle differential further includes an inter-axle differential lock.

As aspects of certain embodiments, the inter-axle differential lock selectively engages the housing of the differential mechanism.

As aspects of certain embodiments, the inter-axle differential lock includes a main body having a plurality of teeth formed thereon.

As aspects of certain embodiments, the main body of the inter-axle differential lock is disposed about the second side gear.

As aspects of certain embodiments, the teeth of the main body of the inter-axle differential lock selectively engages a plurality of teeth formed on a housing of the differential mechanism.

As aspects of certain embodiments, the inter-axle differential further includes an actuator assembly configured to selectively engage and disengage at least one of the clutch mechanism and the inter-axle differential lock.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION

It is to be understood that the system may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
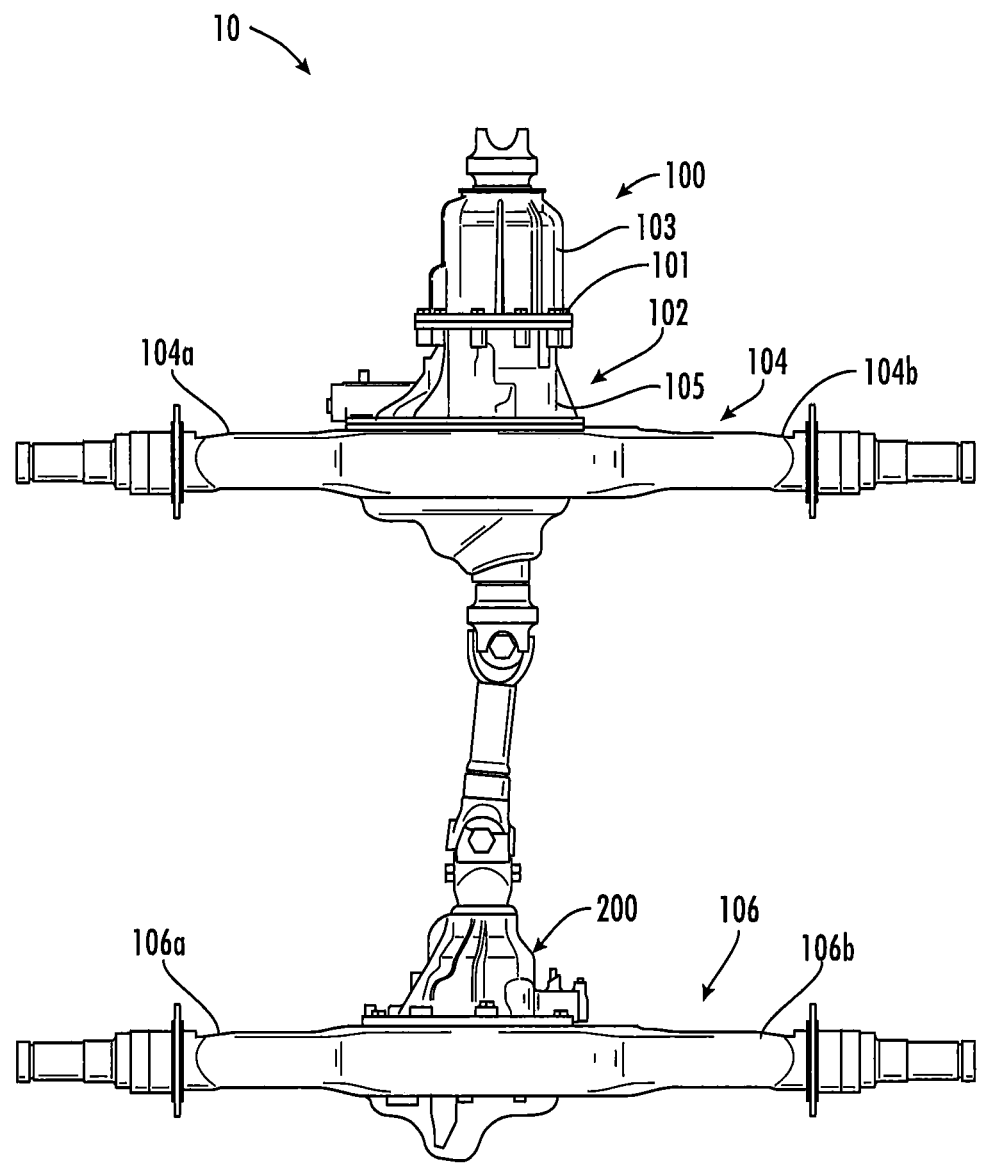
FIG. 1 is a top view a portion of a vehicle including a tandem axle system having an inter-axle differential and clutching assembly, a forward or first axle assembly, and a rear or second axle assembly according to an embodiment of the presently described subject matter.

FIG. 1 illustrates a vehicle 10 including a tandem axle system 100 according to an embodiment of the presently described subject matter. The tandem axle system 100 may be drivingly connected to a transmission (not depicted). The transmission may be drivingly connected to an engine of the vehicle 10 or other source of rotational power. In certain embodiments, the transmission can be, but is not limited to, an automated manual transmission, a dual clutch transmission, an automatic transmission or a manual transmission.

The tandem axle system 100 shown includes an inter-axle differential and clutching assembly 102, a forward or first axle assembly 104, and a rear or second axle assembly 106.

The first axle assembly 104 and the second axle assembly 106 are in selective driving engagement with the inter-axle differential and clutching assembly 102. Although the axle assemblies 104, 106, as illustrated, are substantially similar in size and shape, it is understood that the axle assemblies 104, 106 may have different sizes and shapes depending on the functions assigned to each, if desired.

Figure 2:
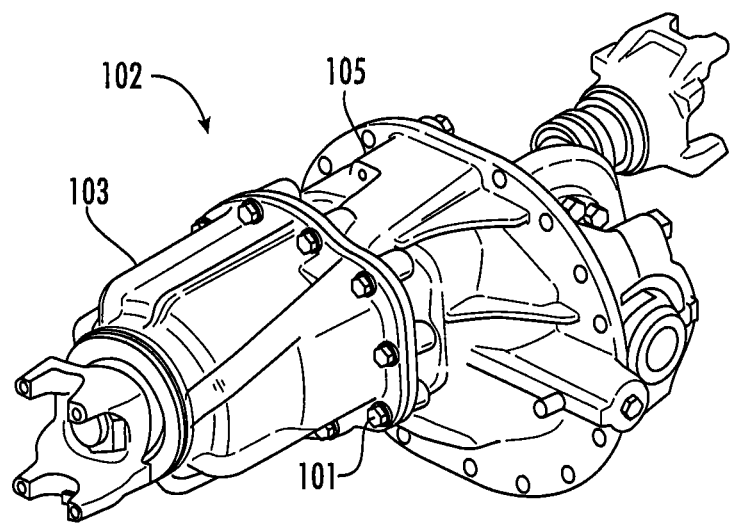
FIG. 2 is a front perspective view of the inter-axle differential and clutching assembly of the tandem axle system shown in FIG. 1 according to an embodiment of the presently described subject matter.
Figure 3:
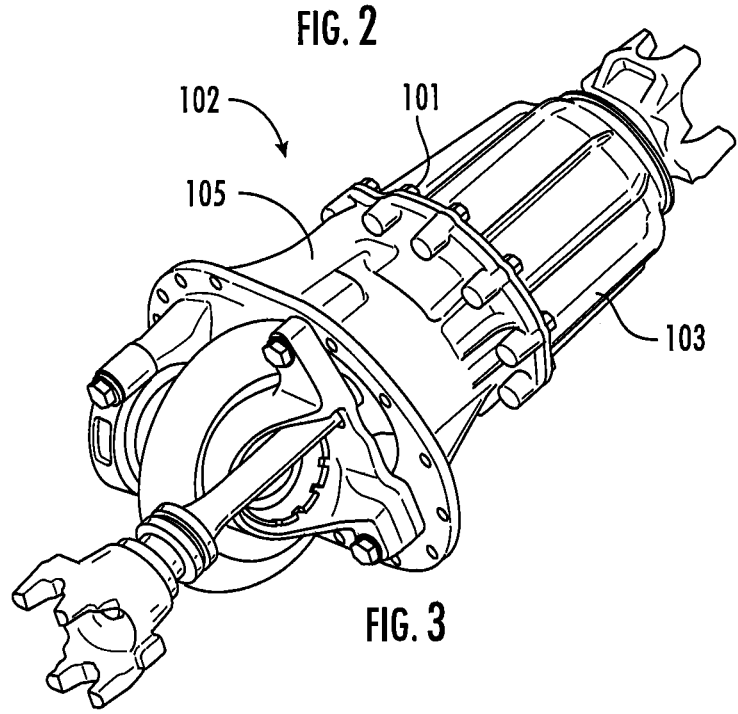
FIG. 3 is a rear perspective view of the inter-axle differential and clutching assembly of the tandem axle system shown in FIG. 1.
Figure 4:
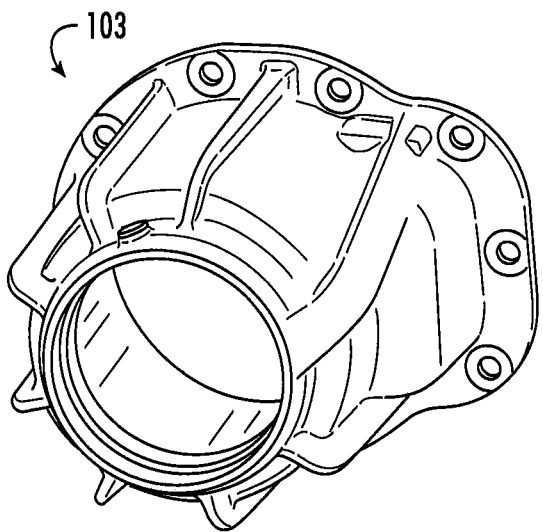
FIG. 4 is a front perspective view of a first housing portion of the inter-axle differential and clutching assembly shown in FIGS. 1-3 according to an embodiment of the presently described subject matter.
Figure 5:
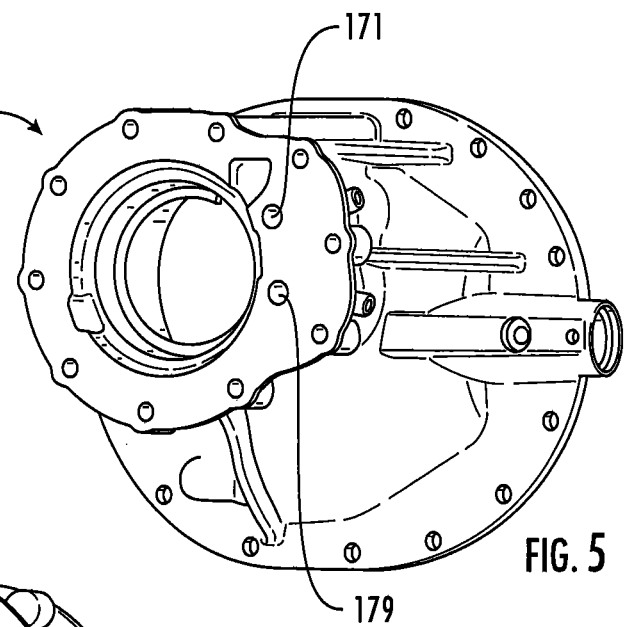
FIG. 5 is a front perspective view of a second housing portion of the inter-axle differential and clutching assembly shown in FIGS. 1-3 according to an embodiment of the presently described subject matter.
Figure 6:
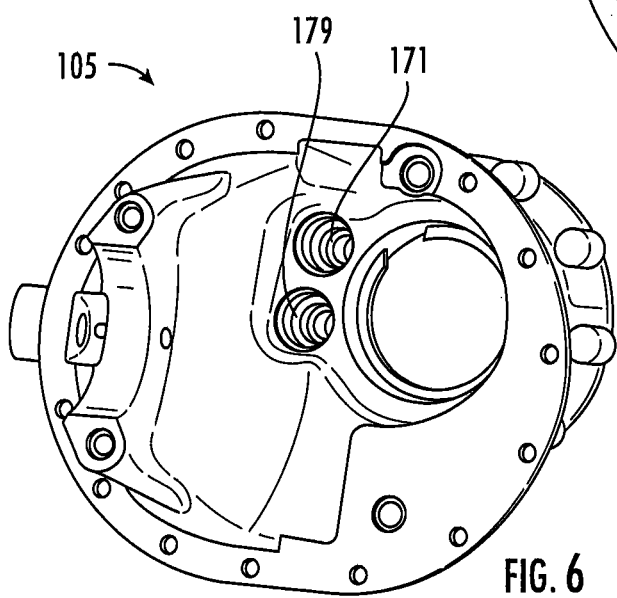
FIG. 6 is a rear perspective view of the second housing portion of the inter-axle differential and clutching assembly shown in FIGS. 1-3 and 5 according to an embodiment of the presently described subject matter.

In certain embodiments, the first axle assembly 104 may include a set of axle half shafts 104a, 104b and a differential assembly (not depicted) drivingly connected thereto. Similarly, the second axle assembly 106 may include a set of axle half shafts 106a, 106b. As shown in FIGS. 2-3, the inter-axle differential and clutching assembly 102 may include a first housing portion 103 and a second housing portion or carrier 105. Various shapes, sizes, and configurations may employed for each of the housing portions 103, 105 such as the embodiments of the first housing portion 103 shown in FIG. 4 and the second housing portion 105 shown in FIGS. 5-6. As a non-limiting example, the housing portions 103, 105 are coupled to each other by a plurality of fasteners 101. It is understood, however, that any suitable means of coupling the housing portions 103, 105 together may be employed such as by mechanical and non-mechanical methods, if desired. It should be appreciated that additional housing portions may be employed or the housing portions 103, 105 may be integrally formed as a unitary component if desired.

Figure 7:
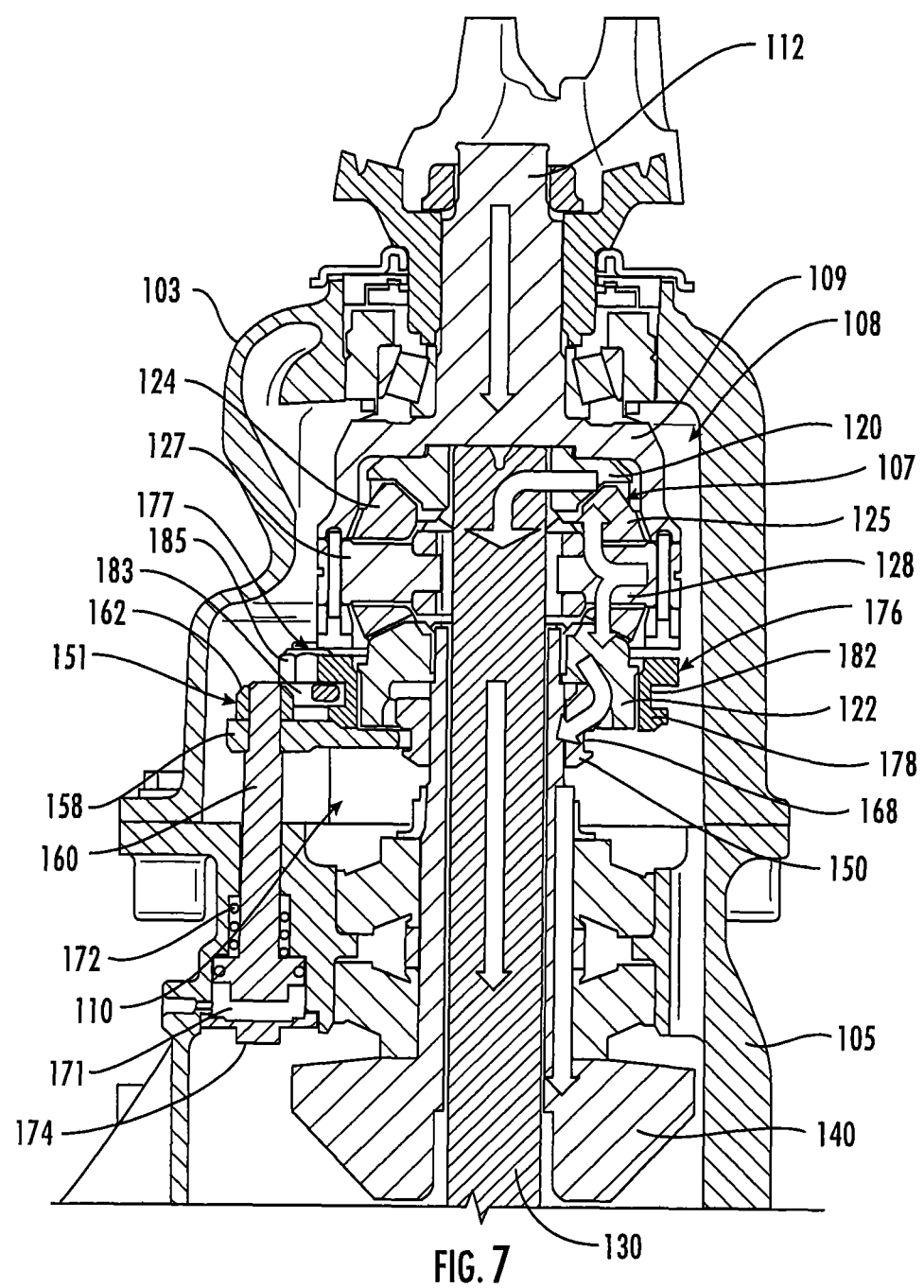
FIG. 7 is a cross-sectional view of a portion of the inter-axle differential and clutching assembly shown in FIGS. 1-3 according an embodiment of the presently described subject matter, wherein an inter-axle differential lock is shown in a first or disengaged position and a clutch mechanism for axle disconnect is shown in a first or engaged position.
Figure 8:
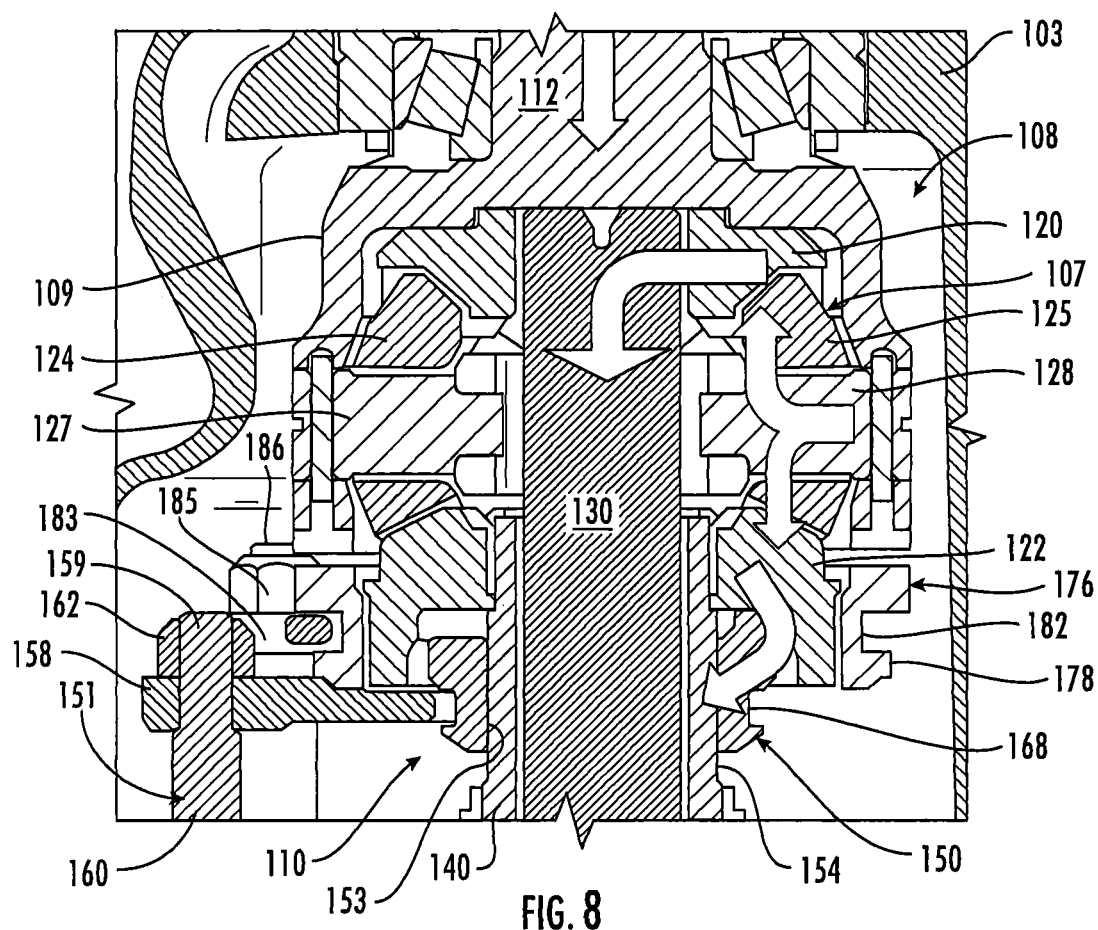
FIG. 8 is an enlarged cross-sectional view of a portion of the inter-axle differential and clutching assembly shown in FIGS. 1-3 according an embodiment of the presently described subject matter, wherein the inter-axle differential lock is shown in the first or disengaged position and the clutch mechanism for axle disconnect is shown in the first or engaged position.
Figure 9:
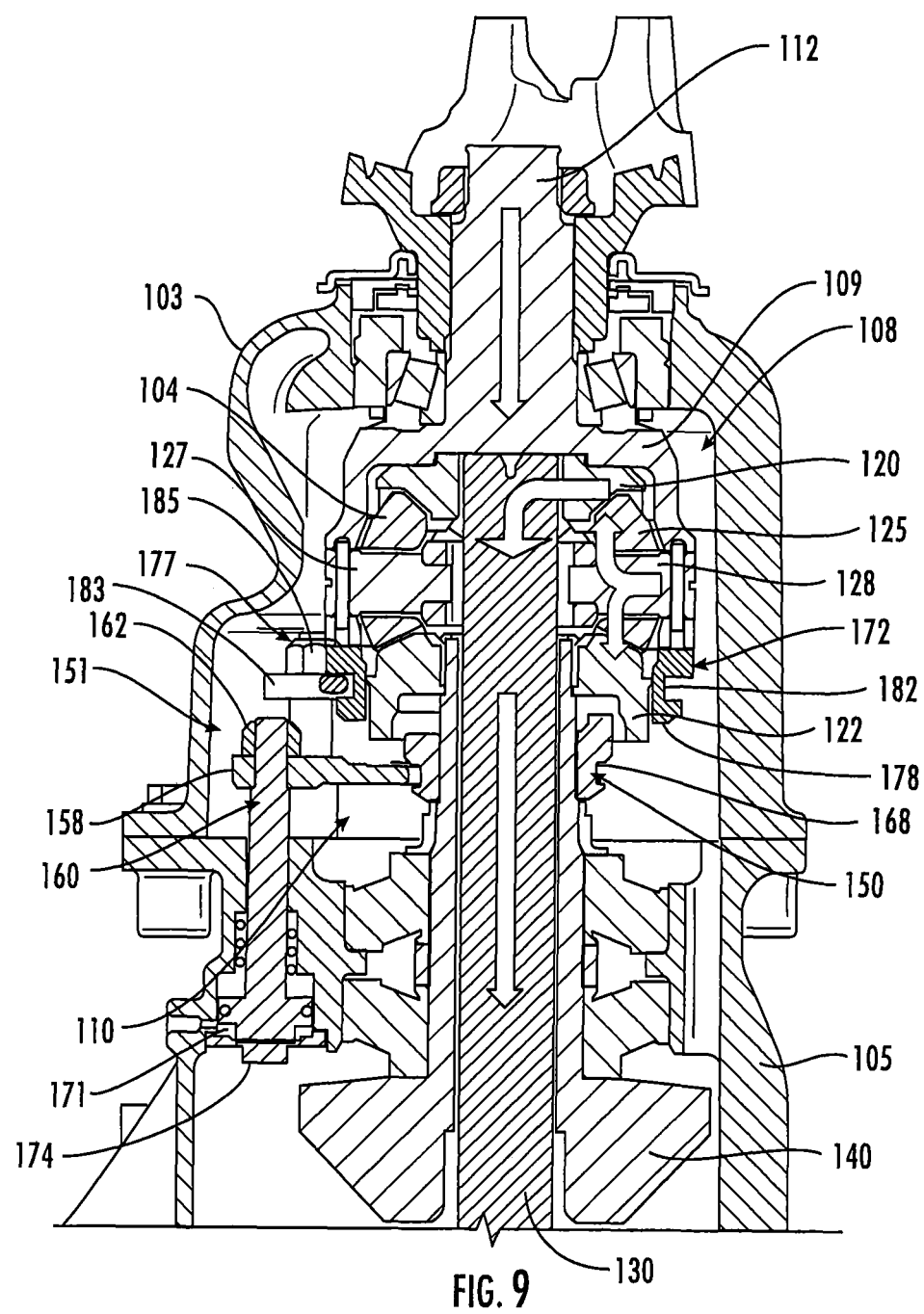
FIG. 9 is a cross-sectional view of a portion of the inter-axle differential and clutching assembly shown in FIGS. 1-3 according an embodiment of the presently described subject matter, wherein the inter-axle differential lock is shown in a second or engaged position and the clutch mechanism is shown in a second or disengaged position.

As illustrated in FIGS. 7-9, the inter-axle differential and clutching assembly 102 may further include an inter-axle differential (IAD) 108 disposed within the housing portions 103, 105. In certain embodiments, the IAD 108 includes a differential mechanism 107 disposed within a housing 109 and a clutch mechanism for axle disconnect 110. In some embodiments, the differential mechanism 107 in the housing 109 is positioned within the housing position 103 and the clutch mechanism for axle disconnect 110 is at least partially positioned within both the housing portions 103, 105.

The IAD 108 is configured to divide a torque received from an input or source of torque (not depicted) between the first axle assembly 104 and the second axle assembly 106. It should be appreciated that the IAD 108 may be used for other purposes and applications as desired. In certain embodiments, the torque is transferred from a driveline transmission of the vehicle 10 to the IAD 108 through an input shaft 112 formed with the housing 109. It is understood that the input shaft 112 may be integrally formed with the housing 109 or as a separate and distinct component.

Figure 12:
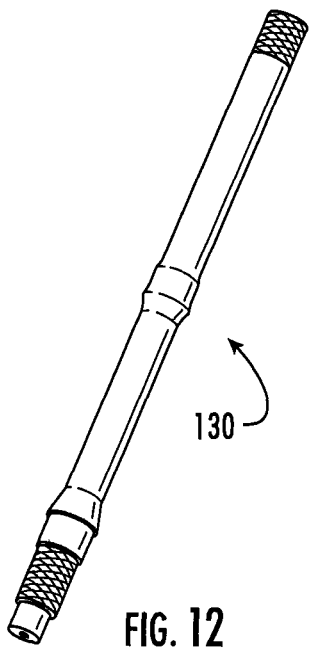
FIG. 12 is a perspective view of a through-shaft of the inter-axle differential and clutching assembly shown in FIGS. 7-9 according to an embodiment of the presently described subject matter.

In the embodiment shown in FIGS. 7-9, the differential mechanism 107 of the IAD 108 may include a first side gear 120, an opposing second side gear 122, and a pair of opposing pinion gears 124, 125. Additional pinion gears (not depicted) may be employed as desired. In certain embodiments, the pinion gears 124, 125 may be coupled to the housing 109 via respective pinion shaft 127, 128. The pinion shafts 127, 128 may be configured to transfer the torque from the housing 109 of the IAD 108 to the pinion gears 124, 125. As illustrated, the first side gear 120 may be arranged to transfer the torque from the pinion gears 124, 125 to a through-shaft 130 (depicted in FIG. 12). In certain embodiments, the first side gear 120 is disposed concentrically about the through-shaft 130 and coupled thereto for rotation therewith. Various methods of coupling the first side gear 120 to the through-shaft 130 may be employed such as by a splined engagement, for example. In certain embodiments, the through-shaft 130 may also be drivingly connected to the rear axle assembly 106.

Figure 13:
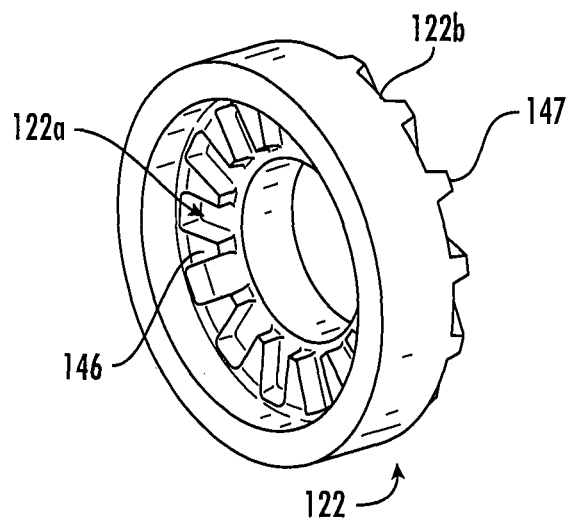
FIG. 13 is a perspective view of a second side gear of an inter-axle differential mechanism of the inter-axle differential and clutching assembly shown in FIGS. 7-11 according to an embodiment of the presently described subject matter.

As shown, the second side gear 122 of the differential mechanism 107 may be arranged to selectively transfer the torque from the pinion gears 124, 125, through the clutch mechanism for axle disconnect 110, to a hollow pinion 140 disposed concentrically about the through-shaft 130. In some embodiments, as shown in FIG. 13, the second side gear 122 has a set of first teeth 146 formed on a first surface 122a and a set of second teeth 147 formed on an opposing second surface 122b. As a non-limiting example, the first teeth 146 of the second side gear 122 are configured to selectively mesh with the clutch mechanism for axle disconnect 110 and the second teeth 147 of the second side gear 122 are configured to mesh with a set of teeth (not depicted) formed on each of the pinion gears 124, 125. In certain embodiments, the second side gear 122 is mounted on a stem of the pinion 140 along with at least one bearing such as a needle roller bearing, for example, to allow free rotation about the pinion 140.

In certain embodiments, the clutch mechanism for axle disconnect 110 includes a movable clutch member 150 and an actuator assembly 151. The clutch member 150 is configured to selectively engage and disengage with the second side gear 122. In certain embodiments, both of the second side gear 122 and the clutch member 150 are disposed concentrically about the pinion 140 and coupled thereto for rotation therewith. Various methods of coupling the second side gear 122 and the clutch member 150 to the pinion 140 may be employed such as by a splined engagement, for example. In certain embodiments, the clutch member 150 is coupled to the pinion 140 by a splined engagement to permit the clutch member 150 to translate axially along a longitudinal axis of the pinion 140.

Figure 14:
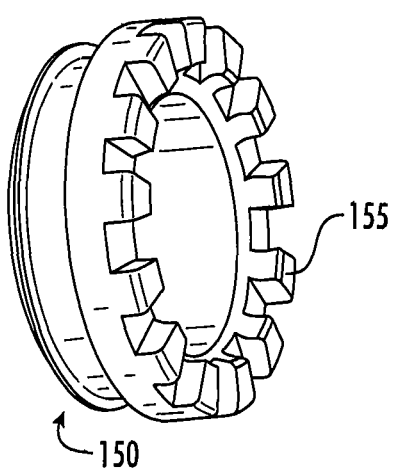
FIG. 14 is a perspective view of a movable clutch member of the clutch mechanism of the inter-axle differential and clutching assembly shown in FIGS. 7-11 according to an embodiment of the presently described subject matter.

As more clearly shown in FIG. 9, the clutch member 150 is rotatably mounted on the stem of the pinion 140. In certain embodiments, a set of splines (not depicted) on a radially inner surface 153 of the clutch member 150 may be engaged with a set of splines (not depicted) on a radially outer surface 154 of the stem of the pinion 140. A set of teeth 155 (illustrated more clearly in FIG. 14) is formed on an axial end of the clutch member 150 to selectively engage with the teeth 146 (illustrated more clearly in FIG. 13) formed on the second side gear 120. The clutch mechanism for axle disconnect 110 is axially movable along the stem of the pinion 140 by the actuator assembly 151 as shown in FIGS. 7-11 to selectively engage and disengage the second side gear 120. In some embodiments, the clutch mechanism for axle disconnect 110 selectively connects the IAD 108 to axle half shafts 104a, 104b of the forward axle assembly 104 through the pinion 140. In certain embodiments, the actuator assembly 151 is used to position the clutch mechanism for axle disconnect 110.

Figure 15:
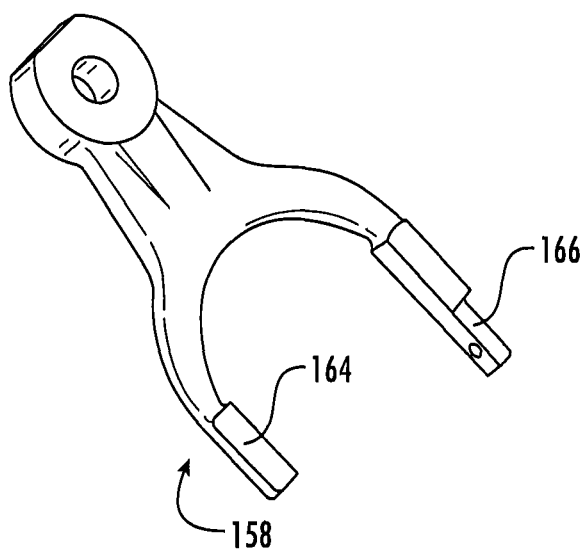
FIG. 15 is a perspective view of an actuator of an actuator assembly of the inter-axle differential and clutching assembly shown in FIGS. 7-11 according to an embodiment of the presently described subject matter.

As a non-limiting example, the actuator assembly 151 may be a shift fork assembly using a pneumatic shifting mechanism to position the shift fork. It should be appreciated, however, that various other types of actuator assemblies may be employed as the actuator assembly 151 if desired. In certain embodiments, the actuator assembly 151 includes an actuator 158 (i.e. a shift fork shown in FIG. 15). In some embodiments, the actuator 158 may be connected to an axial first end 159 of a push rod 160 by a nut 162. In other embodiments, the actuator 158 may be connected to the push rod 160 by any suitable method as desired. As shown, the actuator 158 is disposed at least partially about an outer circumferential surface of the clutch member 150. The actuator 158, depicted in FIG. 15, may include a first portion 164 and an opposing second portion 166. As a non-limiting example, the portions 164, 166 of the actuator 158 may be received into an annular groove 168, more clearly illustrated in FIG. 9, formed in the clutch member 150. In other embodiments, the actuator 158 may positioned adjacent the clutch member 150 opposite the second gear 120.

Figure 10:
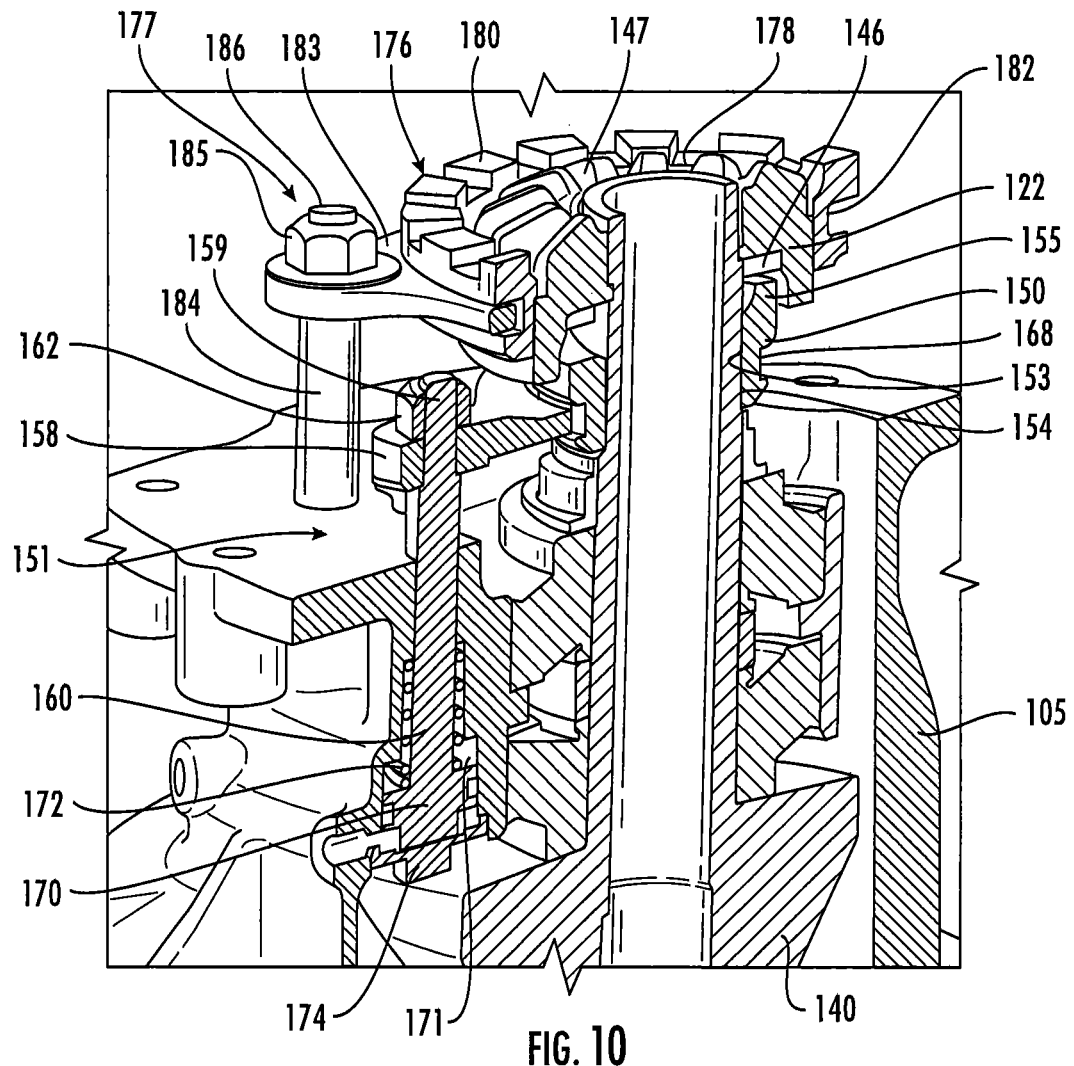
FIG. 10 is an enlarged side perspective view, partially in section, of a portion of the inter-axle differential and clutching assembly shown in FIGS. 1-3 according to an embodiment of the presently described subject matter.
Figure 11:
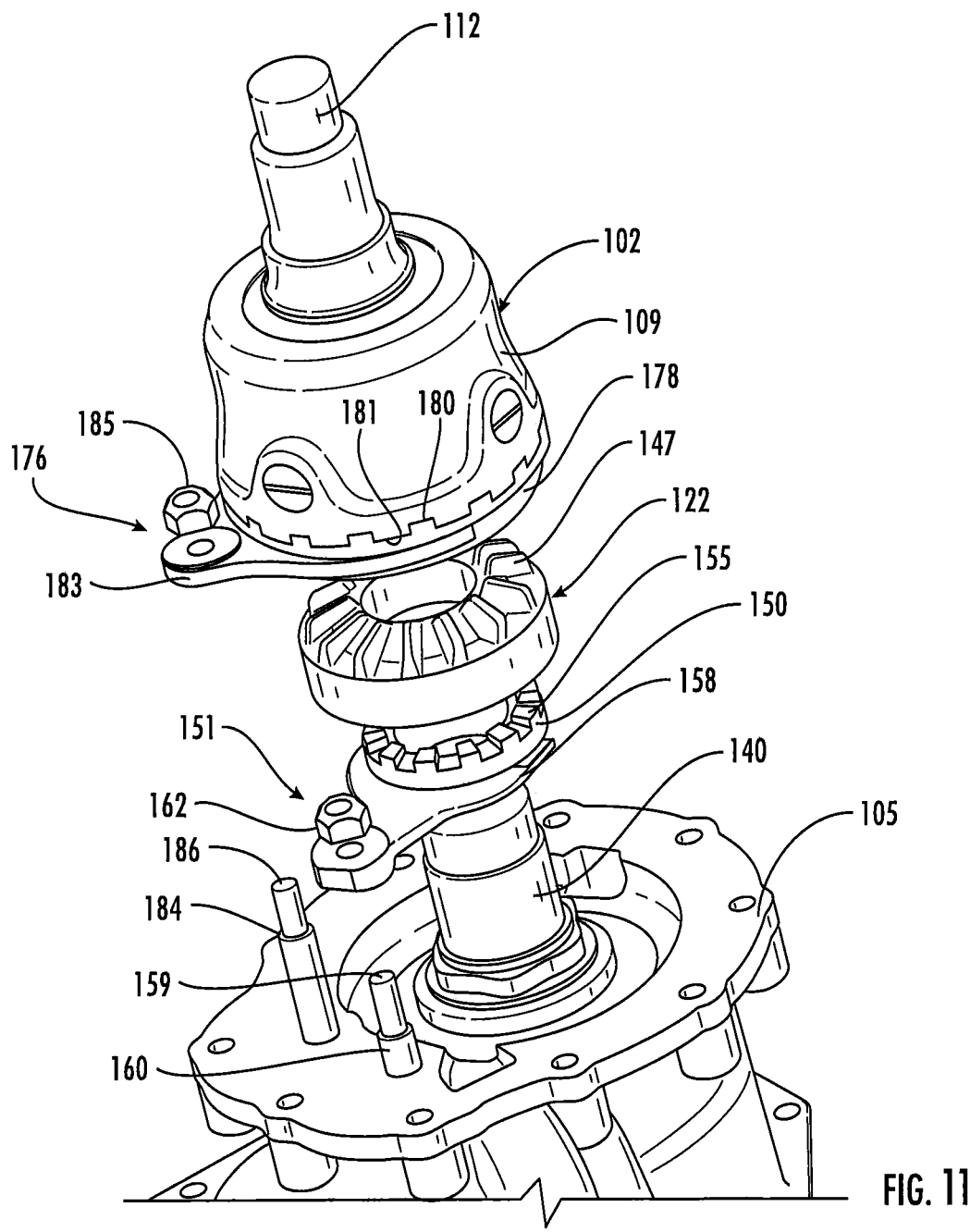
FIG. 11 is a partially exploded side perspective view of a portion of the inter-axle differential and clutching assembly shown in FIGS. 1-3 according to an embodiment of the presently described subject matter.

Referring now to FIG. 10, the push rod 160 may have an axial second end 170 disposed in a cavity 171 formed in the second housing portion 105. As illustrated, the push rod 160 may also have a biasing member 172 surrounding an outer surface of the push rod 160 inside the cavity 171 of the second housing portion 105. A cap 174 is disposed on the second end 170 of the push rod 160 to limit an axial movement of the push rod 160 within the cavity 171 of the second housing portion 105.

In certain embodiments, the IAD 108 may further include an inter-axle differential lock 176 configured to selectively engage and disengage with the housing 109. As a non-limiting example, the inter-axle differential lock 176 is in a first or disengaged position when the clutch mechanism for axle disconnect 110 is in a first or engaged position, as shown in FIGS. 7 and 8, and the inter-axle differential lock 176 is in a second or engaged position when the clutch mechanism for axle disconnect 110 is in a second or disengaged position, as shown in FIG. 9. As more clearly illustrated in FIG. 10, the inter-axle differential lock 176 may include a main body 178 having a set of teeth 180 formed on an axial end surface and an annular groove 182 formed in an outer circumferential surface thereof. In the embodiment shown in FIG. 11, the teeth 180 may be configured to mesh with a set of teeth 181 formed on an end surface of the housing 109 of the IAD 108 for rotation therewith when the inter-axle differential lock 176 is in the first or engaged position.

In one embodiment, the inter-axle differential lock 176 may be caused to be selectively engaged and disengaged by an actuator assembly 177. As a non-limiting example, the actuator assembly 177 may be a shift fork assembly using a pneumatic shifting mechanism to position the shift fork. It should be appreciated, however, that various other types of actuator assemblies may be employed as the actuator assembly 177 if desired. In certain embodiments, the actuator assembly 177 includes an actuator 183 (i.e. a shift fork more clearly shown in FIG. 10). In some embodiments, the actuator 183 may be connected to an axial first end 186 of a push rod 184 by a nut 185. In other embodiments, the actuator 183 may be connected to the push rod 184 by any suitable method as desired. As shown, the actuator 183 is disposed at least partially about an outer circumferential surface of the main body 178 of the inter-axle differential lock 176. The actuator 183 may include a first portion (not depicted) and a spaced-apart opposing second portion (not depicted). As a non-limiting example, the portions of the actuator 183 may be received into the annular groove 182, more clearly illustrated in FIG. 10, formed in the main body 178. Referring now to FIG. 10, the push rod 184 may have an axial second end (not depicted) disposed in a cavity 179 (depicted in FIG. 6) formed in the second housing portion 105. A biasing member (not depicted) may be surround an outer surface of the push rod 184 inside the cavity 179 of the second housing portion 105. A cap (not depicted) may be disposed on the second end of the push rod 184 to limit an axial movement of the push rod 184 within the cavity 179 of the second housing portion 105. In another embodiment, the inter-axle differential lock 176 may be caused to be selectively engaged and disengaged with the housing 109 by the actuator assembly 151, thereby employing only a single actuator assembly 151 for the IAD 108.

Referring now to FIG. 1, the rear axle assembly 106 may include a differential assembly 200. The differential assembly 200 is drivingly connected to a set of axle half shafts 106a, 106b of the rear axle assembly 106. It should be appreciated that the differential assembly 200 may be any suitable differential assembly 200 as desired.

In some embodiments, the vehicle 10 may also include a control system (not depicted). The control system allows an operator of the vehicle 10 and/or the controller to control the tandem axle system 100. The control system includes at least one controller and one or more sensors or a sensor array. The sensors can be intelligent sensors, self-validating sensors and smart sensors with embedded diagnostics. The controller is configured to receive signals and communicate with the sensors. The one or more sensors are used to monitor performance of the tandem axle system 100. The sensors can collect data from the driveline of the vehicle including, but not limited to, the torque and rotational speed of at least one of the axle half shafts 104a, 104b, 106a, 106b. The speed of rotation and the torque are indicative of the speed of rotation and torque of the engine. In one embodiment, the sensors are mounted along at least one of the axle half shafts 104a, 104b, 106a, 106b, but can also be mounted elsewhere on the vehicle 10. In one embodiment, the control system includes additional discrete sensors beyond sensors already included in other components of the vehicle.

The control system can also include a vehicle communication datalink in communication with the sensors and the controller. The sensors generate signals that can be directly transmitted to the controller or transmitted via the datalink or a similar network. In one embodiment, the controller can be integrated into an existing controller system in the vehicle including, but not limited to, an engine controller, a transmission controller, etc. or can be a discrete unit included in the control system. The controller may communicate a vehicle communication datalink message (comm. link J1939 or the like) to other components of the driveline including, but not limited to, the engine.

In one embodiment, the controller is an electrical control unit (ECU). The ECU herein can be configured with hardware alone, or to run software, that permits the ECU to send, receive, process and store data and to electrically communicate with sensors, other components of the driveline or other ECUs in the vehicle. Additionally, the controller can include a microprocessor. The microprocessor is capable of receiving signals, performing calculations based on those signals and storing data received from the sensors and/or programmed into the microprocessor. The control system allows an operator of the vehicle 10 and/or the controller to control the tandem axle system 100. In some embodiments, the control system includes an axle control unit in communication with the clutch mechanism for axle disconnect 110.

In some embodiments, the control system receives signals noting the vehicle 10 is moving above predetermined speed or condition and send a signal to the clutch mechanism for axle disconnect 110 to disconnect the front axle assembly 104 by disengaging the clutch member 150 from the second side gear 122.

In operation, when a 6×4 mode of the vehicle 10 is desired, the clutch mechanism for axle disconnect 110 is caused to move to the first or engaged position in which the clutch member 150 engages with the second side gear 122 and the inter-axle differential lock 176 is caused to move to the first or disengaged position in which the main body 178 disengages from the housing 109 of the IAD 108, the torque flows from the second side gear 122 to the pinion 140 of the front axle assembly 104 and the vehicle configuration changes from the 6×2 mode to the 6×4 mode as shown in FIGS. 7 and 8.

When a 6×2 mode of the vehicle 10 is desired, the clutch mechanism for axle disconnect 110 is caused to move to the second or disengaged position in which the clutch member 150 disengages from the second side gear 122 and the inter-axle differential lock 176 is caused to move to the second or engaged position in which the main body 178 engages with the housing 109 of the IAD 108, the torque from the input shaft 112 is disconnected from the second side gear 122 of the IAD 108 of the front axle assembly 104 and the vehicle configuration changes from the 6×4 mode to the 6×2 mode as shown in FIG. 9.

The foregoing description details certain embodiments. It will be appreciated, however, that no matter how detailed the foregoing appears in text, the preferred embodiments can be practiced in many ways. As is also stated above, it should be noted that the use of particular terminology when describing certain features or aspects of the preferred embodiments should not be taken to imply that the terminology is being re-defined herein to be restricted to including any specific characteristics of the features or aspects of the embodiments with which that terminology is associated.

While preferred embodiments have been shown and described herein, it will be obvious to those skilled in the art that such embodiments are provided by way of example only. Numerous variations, changes, and substitutions will now occur to those skilled in the art without departing from the preferred embodiments. It should be understood that various alternatives to the embodiments described herein may be employed in practice. It is intended that the following claims define the scope of the preferred embodiments and that methods and structures within the scope of these claims and their equivalents be covered thereby.

What is claimed is:

1. A tandem axle system comprising:
    a first axle assembly;
    a second axle assembly;
    an inter-axle differential and clutching assembly coupled to at least one of the first axle assembly and the second axle assembly, wherein the inter-axle differential and clutching assembly includes an inter-axle differential having a differential mechanism and a clutch mechanism, wherein the inter-axle differential includes an inter-axle differential lock, wherein the differential mechanism is at least partially disposed in a housing and includes a first side gear drivingly connected to one of the first and second axle assemblies, and a second side gear disposed about a pinion drivingly connected to a remaining one of the first and second axle assemblies, and wherein the clutch mechanism includes a movable clutch member disposed on the pinion and configured to selectively engage the second side gear.

2. The tandem axle system of claim 1, wherein at least one of the first axle assembly and the second axle assembly includes a plurality of axle half shafts.

3. The tandem axle system of claim 1, wherein the differential mechanism further includes a bearing disposed between the second side gear and the pinion.

4. The tandem axle system of claim 1, wherein the clutch member is in splined engagement with the pinion.

5. The tandem axle system of claim 1, wherein the second side gear includes a plurality of first teeth and a plurality of second teeth formed thereon.

6. The tandem axle system of claim 5, wherein the clutch member includes a plurality of teeth formed thereon.

7. The tandem axle system of claim 6, wherein the teeth of the clutch member selectively engages the first teeth formed on the second side gear.

8. The tandem axle system of claim 5, wherein the second teeth of the second side gear are in meshed engagement with at least one pinion gear of the differential mechanism.

9. The tandem axle system of claim 1, wherein the inter-axle differential lock selectively engages the housing of the differential mechanism.

10. The tandem axle system of claim 1, wherein the inter-axle differential lock includes a main body having a plurality of teeth formed thereon.

11. The tandem axle system of claim 10, wherein the main body of the inter-axle differential lock is disposed about the second side gear.

12. The tandem axle system of claim 11, wherein the teeth of the main body of the inter-axle differential lock selectively engages a plurality of teeth formed on the housing of the differential mechanism.

13. The tandem axle system of claim 1, wherein the inter-axle differential further includes an actuator assembly configured to selectively engage and disengage at least one of the clutch mechanism and the inter-axle differential lock.

* * * * *